UNITED STATES PATENT OFFICE.

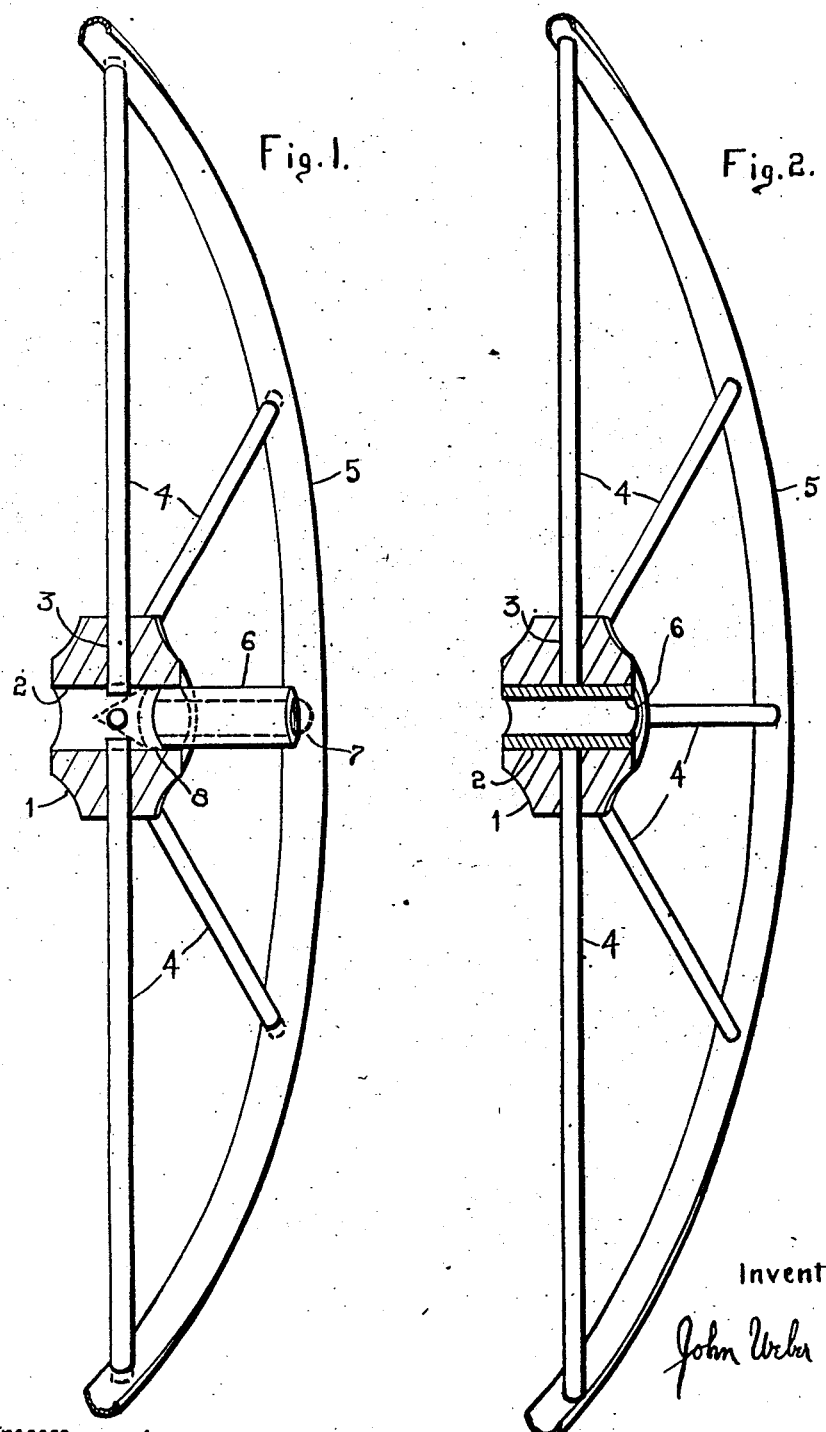

JOHN WEBER, JR., OF TOLEDO, OHIO, ASSIGNOR TO THE TOLEDO METAL WHEEL COMPANY, OF TOLEDO, OHIO, A CORPORATION OF OHIO.

ART OF ASSEMBLING WHEELS.

No. 855,369. Specification of Letters Patent. Patented May 28, 1907.

Application filed May 12, 1906. Serial No. 316,447.

*To all whom it may concern:*

Be it known that I, JOHN WEBER, Jr., a citizen of the United States, residing at Toledo, in the county of Lucas and State of Ohio, have invented certain new and useful Improvements in the Art of Assembling Wheels, of which the following is a specification.

This invention relates to assembling, and more particularly to a speedy, accurate and economical mode of arranging elements in true and proper position.

This invention has utility when adapted to wheel making, wherein it possesses exceptional advantages in the manufacture of the lighter varieties.

Referring to the drawings for an illustration setting forth an embodiment of the invention: Figure 1 is a perspective view in section of a wheel showing a stage in assembling, and Fig. 2 is a similar view at a later stage.

The member or hub 1 has a longitudinal recess 2 and a plurality of transverse recesses or spoke guiding apertures 3 extending laterally of the recess or bore 2 or radially of the wheel. In this instance the transverse recesses 3 are shown radial. In the recesses 3 are placed elements or spokes 4 beyond their normal position, as shown in full lines in Fig. 1. A second endless channel-shaped member or rim 5 is placed in any angular relation in the same plane as the hub 1 and approximately concentric thereto. By moving or forcing the spokes 4 from the full line position of Fig. 1 to the dotted line position, the rim or tire 5 is centered and automatically trued. This longitudinal moving is an equal projection of the spokes; that is, equal as to limit of movement against continuous seating surfaces of the rim, although it is not absolutely essential to the invention that the spokes all move the same distance, for their insertion to project exteriorly and interiorly of the hub need not be exactly uniform.

The spokes are locked and held in position by the assembly-locking means or sleeve 6. To accomplish the assembling, a drift tool 7, shown in dotted lines in Fig. 1, may be conveniently used. Upon the tool 7 is placed the sleeve 6 against a shoulder near the tapering head 8 of the tool, which head is of the same diameter as the recess 2 in the member 1. In driving the tool 7 through the recess 2, the spokes 4 are moved or projected into a non-adjustable position as to the hub 1 to the limit of their penetration against the continuous concave inner surface of the crescent rim 5 to firmly engage the rim. The sleeve 6 following the head 8 of the tool 7, is introduced or left in the recess 2 of the hub 1, thereby locking the spokes in normal position. The sleeve 6 is a permanent member, concentric with the hub member, not only securing the spokes against reverse movement, but locking them into permanent seating relation against the rim member. The tool 7 is driven on through the hub 1 and out of the sleeve 6.

The art of assembling herein described affords a rapid and labor-saving improvement in wheel building.

The showing and description herewith are not to be construed as limiting the scope of the invention to any greater extent than the ordinary meaning of the terms of the claims demand. In other words, the elements of the claims are to be interpreted broadly, giving me the advantage of equivalents in the protection of my idea.

What is claimed and it is desired to secure by Letters Patent is:

1. That improvement in the art of assembling wheels which comprises the following combination of steps: the provision of a hub member and a continuous rim member, one of which shall have spoke guiding passages and the other seating surfaces limiting the longitudinal movement of the spokes and a series of spokes of equal length, and the arrangement of said spokes to project through said passages, and the arrangement of the hub and rim members in an approximately concentric relation but one of them free with relation to the other and the spokes, and the simultaneous and equal projection of the spokes longitudinally toward the other member into permanent seating relation and securing said spokes so seated against reverse movement by applying a permanent concentric member.

2. That improvement in the art of assembling wheels which comprises the following combination of steps: the provision of a hub having spoke guiding passages and a continuous rim having seating surfaces limiting the longitudinal movement of the spokes and having directing walls to guide the spokes to said surfaces and a series of spokes of uniform length, and the arrangement of said spokes to project through said passages, and the arrangement of the hub and rim in an approximately concentric relation but the rim free from the hub and the spokes, and the simultaneous and equal projection of the spokes longitudinally toward the rim to be guided thereby into permanent seating relation and securing said spokes so seated against reverse movement by applying a permanent concentric member.

3. That improvement in the art of assembling wheels which comprises the following combination of steps: the provision of a hub member and a continuous rim member, one of which shall have spoke guiding passages and the other continuous seating surfaces limiting the longitudinal movement of the spokes and a series of spokes of uniform length, and the arrangement of said spokes to project through said passages, and the arrangement of the hub and rim members in approximately concentric relation in a plane, but in any angular relation with one of them free with relation to the other and the spokes, and the simultaneous and equal projection of the spokes longitudinally toward the other member into permanent seating relation and securing said spokes against reverse movement by applying a permanent concentric member.

4. That improvement in the art of assembling wheels which comprises the following combination of steps: the provision of a hub having spoke guiding passages, a rim having a plurality of flanges with adjacent seating surfaces limiting the longitudinal movement of the spokes and a series of spokes of equal length, and the arrangement of said spokes to project through said passages, and the arrangement of the hub and rim in an approximately concentric relation but the rim free from the hub and the spokes, and the simultaneous and equal projection of the spokes longitudinally toward the rim to be guided by the flanges into permanent seating relation and securing said spokes so seated against reverse movement by applying a permanent concentric member.

5. That improvement in the art of assembling wheels which comprises the following combination of steps: the provision of a hub having spoke guiding passages, a series of spokes of uniform length, a rim having spoke seats, spoke actuating means and a spoke locking follower, and the arrangement of the spokes in the passages of the hub, the arrangement of the rim and hub in an approximately concentric relation but the rim free from the hub and the spokes, the arrangement of the follower on the spoke actuating means, the arrangement of the means to actuate the spokes longitudinally into the seats of the rim and leave the follower to retain the spokes in permanent locking position.

6. That improvement in the art of assembling wheels which comprises the following combination of steps: the provision of a hub member and a continuous rim member, one of which shall have spoke guiding passages and the other seating surfaces limiting the longitudinal movement of the spokes and a series of spokes of equal length, and the arrangement of said spokes to project through said passages, the arrangement of the hub and rim members in an approximately concentric relation but one of them free with relation to the other and the spokes, and the simultaneous and uniform projection and locking of the spokes into permanent seating relation.

In testimony whereof I affix my signature in the presence of two witnesses.

JOHN WEBER, Jr.

Witnesses:
  JAY BENSON,
  GEO. E. KIRK.